US009170736B2

(12) United States Patent
Dai et al.

(10) Patent No.: US 9,170,736 B2
(45) Date of Patent: Oct. 27, 2015

(54) HOVER CONTROLLED USER INTERFACE ELEMENT

(71) Applicant: Microsoft Corporation, Redmond, WA (US)

(72) Inventors: Lynn Dai, Samamish, WA (US); Dan Hwang, New Castle, WA (US); Bo-June Hsu, Woodinville, WA (US); Raymond Quan, Seattle, WA (US); Eric Badger, Redmond, WA (US); Jose Rodriguez, Seattle, WA (US); Peter Gregory Davis, Kirkland, WA (US)

(*) Notice: Subject to any disclaimer, the term of this patent is extended or adjusted under 35 U.S.C. 154(b) by 122 days.

(21) Appl. No.: 14/027,533

(22) Filed: Sep. 16, 2013

(65) Prior Publication Data

US 2015/0082216 A1   Mar. 19, 2015

(51) Int. Cl.
*G06F 3/048* (2013.01)
*G06F 3/0488* (2013.01)

(52) U.S. Cl.
CPC ........ *G06F 3/04886* (2013.01); *G06F 3/04883* (2013.01)

(58) Field of Classification Search
CPC .................................................. G06F 3/04886
USPC ........................................ 715/773, 767, 863
See application file for complete search history.

(56) References Cited

U.S. PATENT DOCUMENTS

| 6,501,464 | B1 | 12/2002 | Cobbley |
| 7,602,382 | B2 | 10/2009 | Hinckley |
| 8,381,135 | B2 | 2/2013 | Hotelling |
| 8,384,683 | B2 | 2/2013 | Luo |
| 2006/0161870 | A1 | 7/2006 | Hotelling et al. |
| 2006/0209040 | A1 | 9/2006 | Garside et al. |
| 2010/0277505 | A1 | 11/2010 | Ludden |
| 2012/0105333 | A1 | 5/2012 | Maschmeyer |
| 2013/0050131 | A1 | 2/2013 | Lee |

OTHER PUBLICATIONS

"International Search Report and Written Opinion Issued in PCT Patent Application No. PCT/US2014/055286", Mailed Date: Dec. 10, 2014, 11 Pages.
"Second Written Opinion Issued in PCT Application No. PCT/US2014/055286", Mailed Date: Aug. 5, 2015, 8 Pages.

*Primary Examiner* — William Titcomb
(74) *Attorney, Agent, or Firm* — Mickey Minhas; James Banowsky; Leonard Smith

(57) ABSTRACT

Example apparatus and methods concern controlling a hover-sensitive input/output interface. One example apparatus includes a proximity detector that detects an object in a hover-space associated with the input/output interface. The apparatus produces characterization data concerning the object. The characterization data may be independent of where in the hover-space the object is located. The apparatus selectively controls the activation, display, and deactivation of user interface elements displayed by the apparatus on the input/output interface as a function of the characterization data and interface state. Selectively controlling the activation, display, and deactivation of the user interface elements includes allocating display space on the input/output interface to the user interface elements when they are needed for an operation on the apparatus and selectively reclaiming space on the input/output interface allocated to the user interface elements when they are not needed for an operation on the apparatus.

20 Claims, 9 Drawing Sheets

HOVER CONTROLLED USER INTERFACE ELEMENT

BACKGROUND

In a touch screen device like a smart phone or a tablet computer, a virtual keyboard may be used to input information. For example, on a phone having a touch screen the virtual keyboard may be used to send text messages. When a user is texting, the user may also want to view the content in the text application while typing. Unfortunately, conventional systems may consume so much display space when providing the virtual keyboard that the space left over to display the content of the application may be limited.

One conventional approach provided a user with a tool to resize the virtual keyboard to make it smaller. However, making the keyboard smaller may compromise the typing experience. For example, it may be very difficult, if even possible at all, to see the smaller keys or to type on a smaller keyboard. This may be most noticeable for users with less than perfect vision or with large fingers. Another conventional approach involved compressing a conventional QWERTY keyboard down into a one-row keyboard. The one-row keyboard was then displayed at the bottom of the device. Once again, the typing experience was negatively impacted because less than all the keys were available. Another conventional approach made the virtual keyboard appear or disappear based on heuristics associated with whether the user was touching the screen, whether the user had typed in a while, whether the user had moved their digit(s) (e.g., finger(s), thumb(s)) onto or off of the virtual keyboard, or other actions. However, removing the keyboard may have required cumbersome actions to redisplay the keyboard, which once again may have negatively impacted the typing experience. Another conventional approach may have included dismissing (e.g., removing) the keyboard in response to touching, for example, a "back" capacitive button. Unfortunately, once the keyboard was dismissed there may not have been a convenient way to retrieve the keyboard without tapping on another user interface element (e.g., edit/compose field). Complicating matters even further, if the user happened to scroll their content after the keyboard was dismissed, then the user may have been forced to navigate back to a particular user interface element (e.g., edit/compose field) to retrieve the keyboard. Thus, conventionally, it has been difficult, if even possible at all, to seamlessly save screen space while not compromising the typing experience.

Touch sensitive screens have, in some apparatus, been replaced by hover-sensitive screens that rely on proximity detectors. Conventional hover-sensitive screens displayed user interface elements based on where an object was located in the hover-space. This may have unnecessarily constrained the flexibility of presenting, activating, or deactivating user interface elements.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

Example methods and apparatus are directed toward controlling a user interface on a device having an input/output interface that is hover-space sensitive. Controlling the user interface may include selectively displaying, activating, de-activating, and removing user interface elements based on actions performed in the hover-space and the state of an application(s) or other process using the i/o interface. Activation, display, de-activation, and removal may depend on identifying a control action performed by an object in a hover-space associated with the i/o interface. Unlike conventional systems that are position dependent, the example methods and apparatus described herein may be position independent, depending instead on understanding when a user interface element is or is not needed based on state maintained for user interface elements and location independent control actions performed in the hover-space.

Some embodiments may include a hover-sensitive i/o interface and a proximity detector that detects an object (e.g., finger, thumb, pencil, stylus with capacitive tip) in a three dimensional volume (e.g., hover-space). The hover-space may be disposed in proximity to the i/o interface and in an area accessible to the proximity detector. An embodiment may produce characterization data concerning the object. Unlike conventional systems, the characterization data may be independent of where in the hover-space the object is located. An embodiment may selectively control the activation, display, and deactivation of a first user interface element displayed by the apparatus on the i/o interface as a function of the characterization data.

BRIEF DESCRIPTION OF THE DRAWINGS

The accompanying drawings illustrate various example apparatus, methods, and other embodiments described herein. It will be appreciated that the illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Example apparatus and methods facilitate saving screen space on a device having an i/o interface that is hover-sensitive without compromising the user interaction (e.g., typing) experience. Hover technology is used to detect when a user interface element (e.g., virtual keyboard) is needed or is not needed. "Hover technology" and "hover sensitive" refer to sensing an object spaced away from (e.g., not touching) yet in close proximity to a display in an electronic device. "Close proximity" may mean, for example, beyond 1 mm but within 1 cm, beyond 0.1 mm but within 10 cm, or other combinations of ranges. Being in close proximity includes being within a range where a proximity detector can detect and characterize an object in the hover-space. The device may be, for example, a phone, a tablet computer, a computer, or other device.

Figure 1:
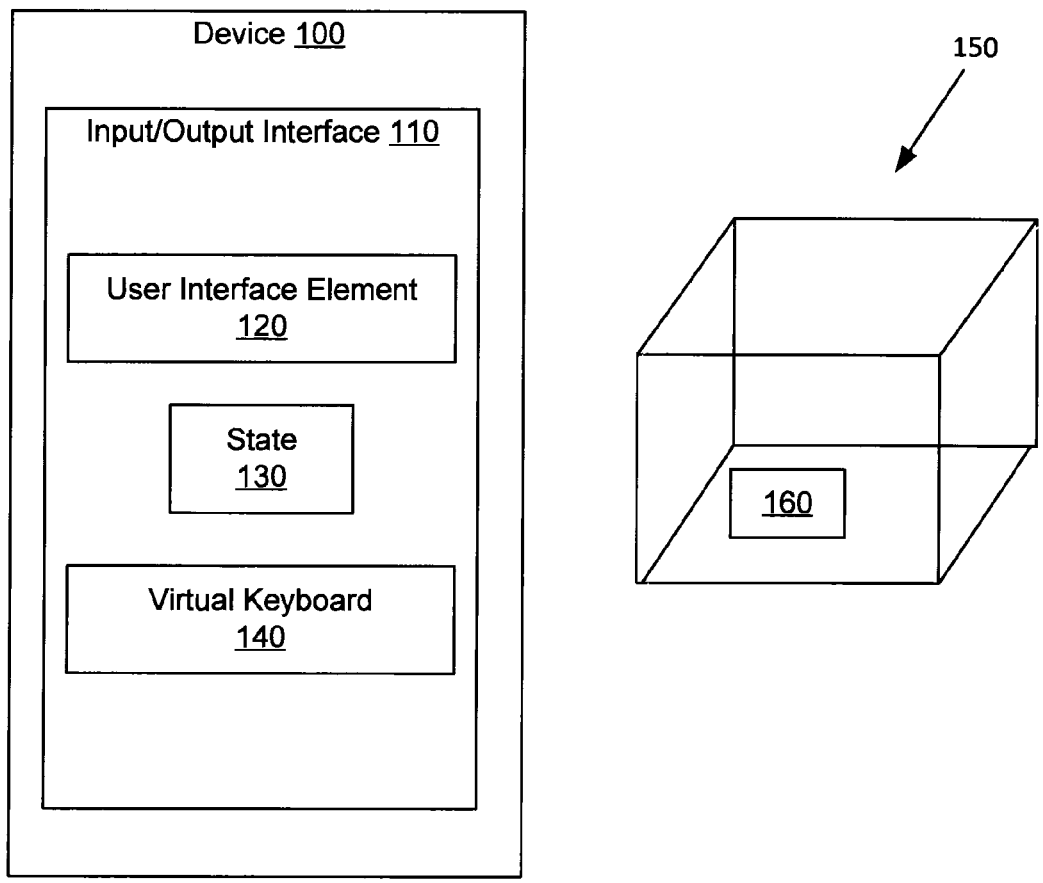
FIG. 1 illustrates an example hover-sensitive device.

FIG. 1 illustrates an example hover-sensitive device 100. Device 100 includes an input/output (i/o) interface 110. I/O interface 100 may display a set of items including, for example, a virtual keyboard 140 and, more generically, a user interface element 120. User interface elements may be used to display information and to receive user interactions. The user interactions may be performed in the hover-space 150 without touching the device 100. Device 100 or i/o interface 110 may store state 130 about the user interface element 120, the virtual keyboard 140, or other items that are displayed. The state 130 of the user interface element 120 may depend on an action performed using virtual keyboard 140. For example, user interface element 120 may be a text display having a text insertion point. Both the contents of the text display and the location of the text insertion point may depend on typing performed in the hover-space 150 using the virtual keyboard 140. When the virtual keyboard 140 is needed, example apparatus and methods display the virtual keyboard 140. When the virtual keyboard 140 is not needed, example apparatus and methods facilitate saving screen space on i/o interface 110 by moving, hiding, changing, or otherwise reconfiguring virtual keyboard 140. However, to minimize the impact on the typing experience, virtual keyboard 140 is reconfigured to be easily re-displayed as needed. Additionally, when the virtual keyboard is re-displayed, a relevant user interface element (e.g., text insertion point in text box) may also be re-displayed and re-positioned based on state 130.

The device 100 may include a proximity detector that detects when an object (e.g., digit, pen) is close to but not touching the i/o interface 110. The proximity detector may identify the location (x, y, z) of an object 160 in the three-dimensional hover-space 150. The proximity detector may also identify other attributes of the object 160 including, for example, the speed with which the object 160 is moving in the hover-space 150, the orientation (e.g., pitch, roll, yaw) of the object 160 with respect to the hover-space 150, the direction in which the object 160 is moving with respect to the hover-space 150 or device 100, a gesture being made by the object 160, or other attributes of the object 160.

In different examples, the proximity detector may use active or passive systems. For example, the proximity detector may use sensing technologies including, but not limited to, capacitive, electric field, inductive, Hall effect, Reed effect, Eddy current, magneto resistive, optical shadow, optical visual light, optical infrared (IR), optical color recognition, ultrasonic, acoustic emission, radar, heat, sonar, conductive, and resistive technologies. Active systems may include, among other systems, infrared or ultrasonic systems. Passive systems may include, among other systems, capacitive or optical shadow systems. In one embodiment, when the proximity detector uses capacitive technology, the detector may include a set of capacitive sensing nodes to detect a capacitance change in the hover-space 150. The capacitance change may be caused, for example, by a digit (e.g., finger, thumb) or other object (e.g., pen) that comes within the detection range of the capacitive sensing nodes. In another embodiment, when the proximity detector uses infrared light, the proximity detector may transmit infrared light and detect reflections of that light from an object within the detection range (e.g., in the hover-space 150) of the infrared sensors. Similarly, when the proximity detector uses ultrasonic sound, the proximity detector may transmit a sound into the hover-space 150 and then measure the echoes of the sounds. In another embodiment, when the proximity detector uses a photodetector, the proximity detector may track changes in light intensity. Increases in intensity may reveal the removal of an object from the hover-space 150 while decreases in intensity may reveal the entry of an object into the hover-space 150.

In general, a proximity detector includes a set of proximity sensors that generate a set of sensing fields in the hover-space 150 associated with the i/o interface 110. The proximity detector generates a signal when object 160 is detected in the hover-space 150. In one embodiment, a single sensing field may be employed. In other embodiments, two or more sensing fields may be employed. In one embodiment, a single technology may be used to detect or characterize the object 160 in the hover-space 150. In another embodiment, a combination of two or more technologies may be used to detect or characterize the object 160 in the hover-space 150.

Determining when the virtual keyboard 140 is or is not desired may including analyzing the presence, posture, or actions of a user's digit(s). If the virtual keyboard 140 is needed, the virtual keyboard 140 will be presented in a useful location. How the virtual keyboard 140 is presented, including the size, position, orientation, or other attributes, may be user configurable or controllable through an application programming interface (API) or other messaging system. If the virtual keyboard 140 is not needed, then the virtual keyboard 140 may be diminished or moved to an out-of-the-way location from which it may be conveniently retrieved.

Figure 2:
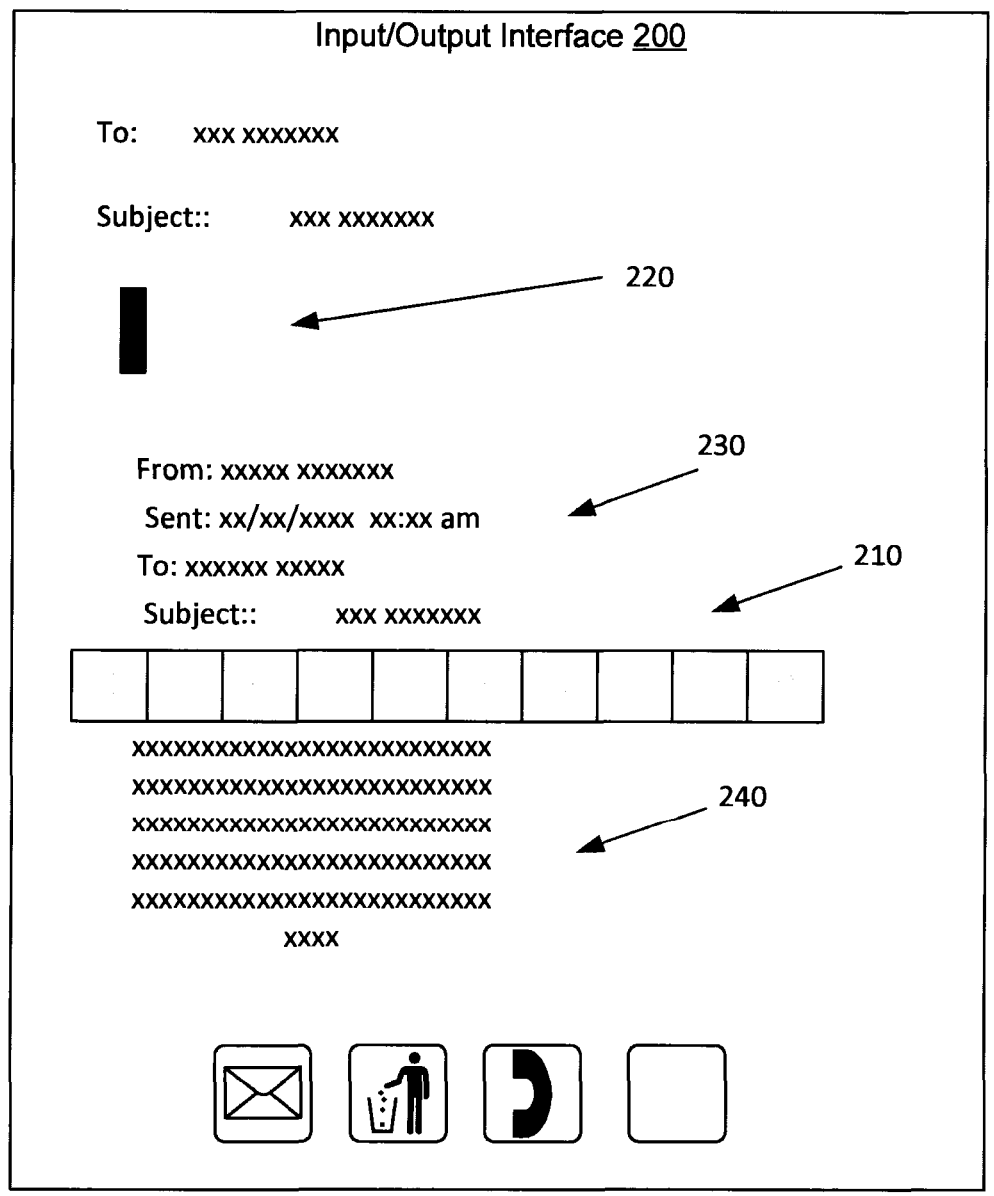
FIG. 2 illustrates an example hover controlled user interface element.
Figure 3:
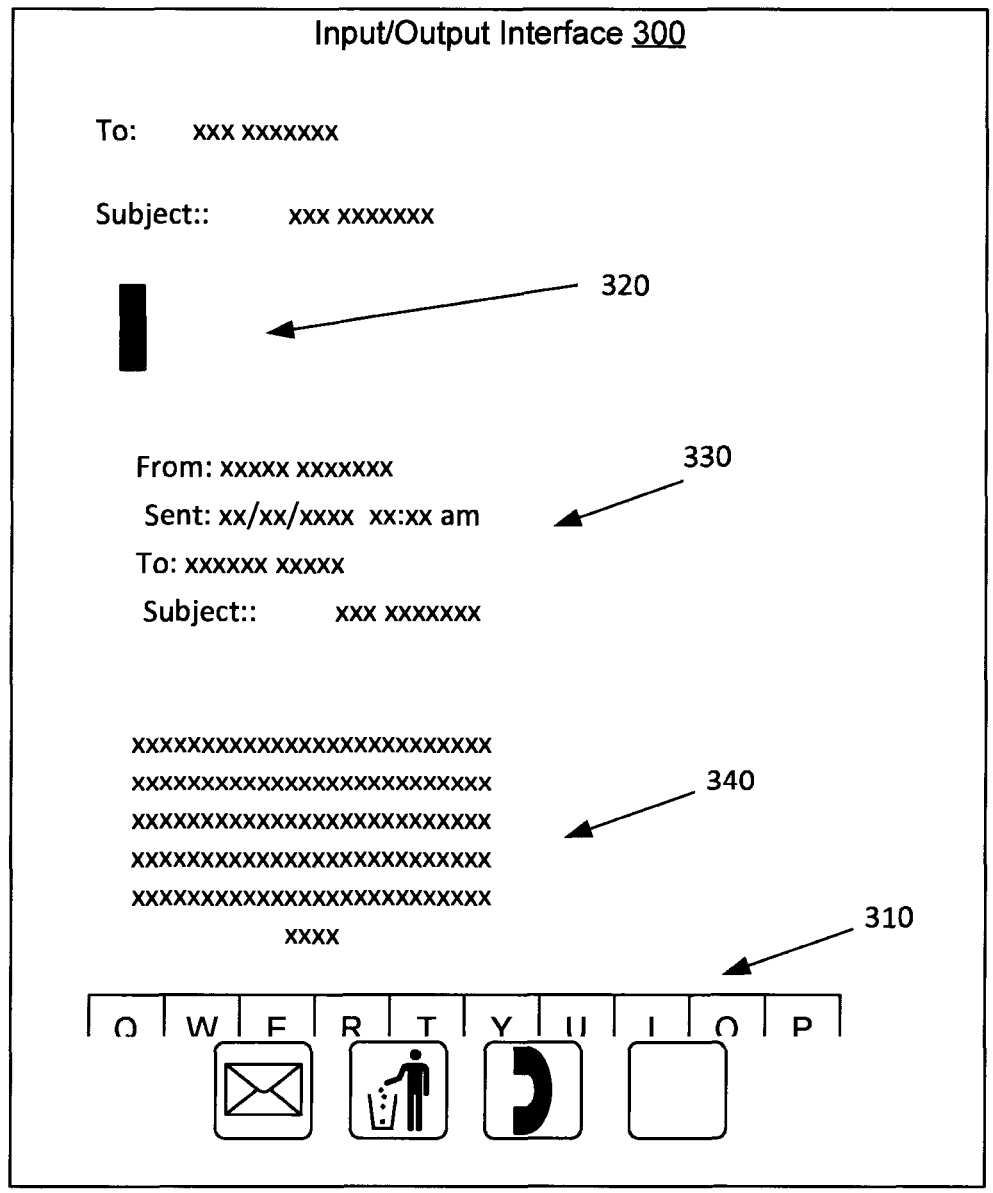
FIG. 3 illustrates an example hover controlled user interface element.
Figure 4:
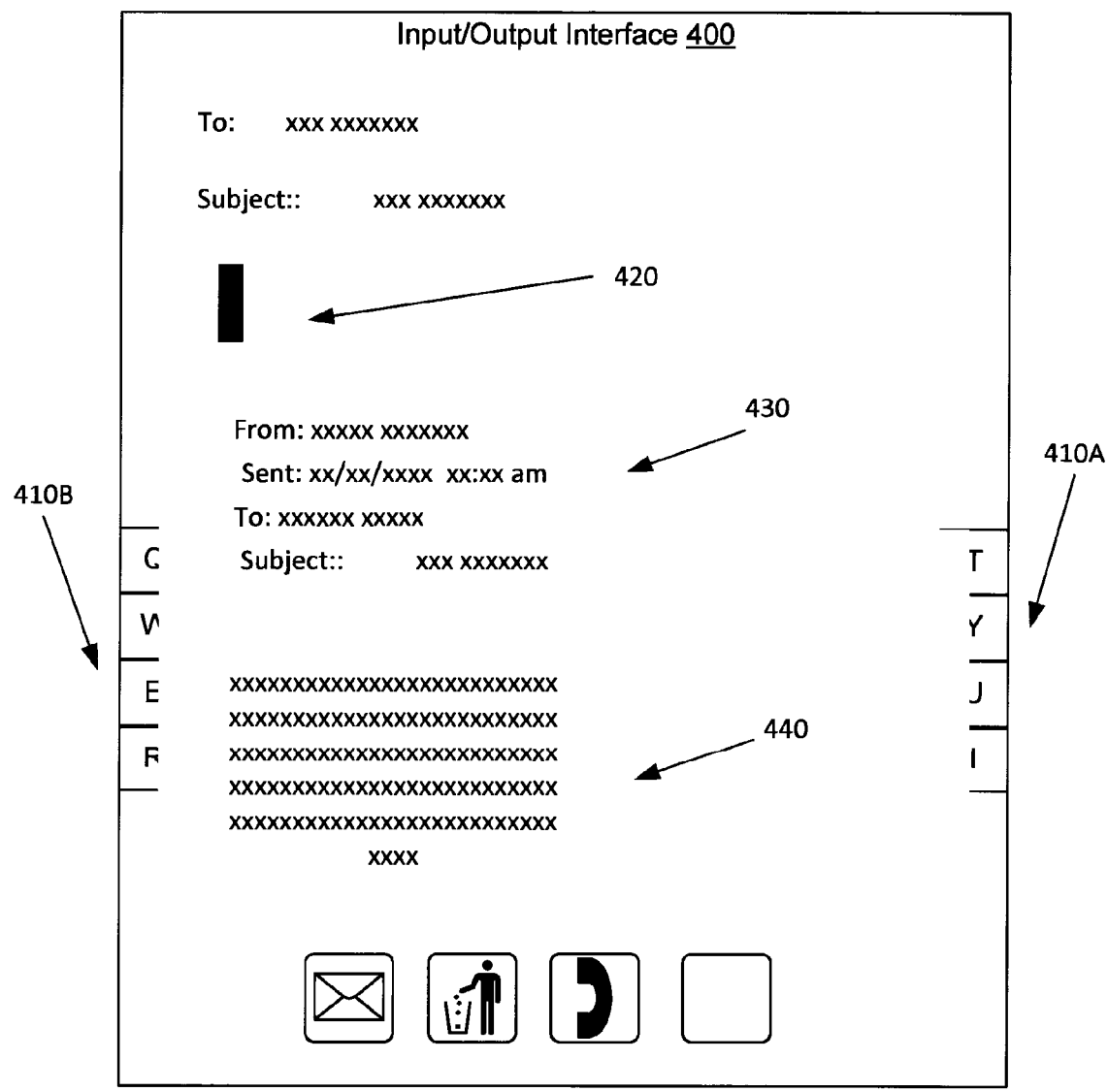
FIG. 4 illustrates an example hover controlled user interface element.

FIGS. 2-4 illustrate different ways for moving, re-arranging, reconfiguring, or otherwise reducing the intrusiveness and display demands for a virtual keyboard.

FIG. 2 illustrates an i/o interface 200. I/O interface 200 is displaying information associated with an email application. For example, header information 230 from a previous email in a thread is displayed above text 240. At the moment pictured in FIG. 2, a user may not have their fingers or thumbs positioned in the hover-space and thus may not be ready to type. Therefore, virtual keyboard 210 has been reduced to just ten keys and has had its intensity lowered and its transparency increased. This may make it easier for a user to read text 240 and header information 230. Additionally, this may make it easier for a user to recognize a text insertion point 220 that is available to receive data associated with virtual keystrokes that may be made using virtual keyboard 210.

FIG. 2 illustrates how, in one embodiment, a virtual keyboard 210 may be made more transparent so that it appears to be behind the application to which the virtual keyboard 210 was providing keystrokes. In one embodiment, the change in transparency may be accompanied by a reduction in the number of keys displayed. For example, less than one hundred percent of the virtual keyboard 210 may be displayed. For example, just a few keys from the home row (e.g., f, g, h, j) may be displayed. Additionally, the keys may be reduced in size or just a portion of the keys may be displayed. Having the keys available, even though diminished in size, transparency, and appearing in the background, saves display space while making retrieving the virtual keyboard 210 simple and intuitive, which in turn prevents compromising the user interface (e.g., typing) experience. When the virtual keyboard 210 is needed, the virtual keyboard 210 may be made more opaque so that it appears to be in front of the application. Additionally, all the keys from the virtual keyboard 210 may once again be displayed at their regular size. Detecting that the virtual keyboard 210 may be needed again may include, for example, detecting the presence of a user digit over the displayed keys, detecting a user action (e.g., simulated typing), detecting a user gesture, or other action. The action may be independent of the location of the reduced virtual keyboard 210.

FIG. 3 illustrates another embodiment of an i/o interface 300 that is displaying a virtual keyboard 310, a text insertion point 320, header information 330, and text 340. Once again the header information 330 and text 340 may be associated with an email application. While an email application is described, other applications (e.g., texting, social media, making notes, word processing) may involve interfacing with a user. At times the user may be using the virtual keyboard 310 to enter text while at other times the user may not be using the virtual keyboard 310. When the virtual keyboard 310 is not needed, the virtual keyboard 310 may be moved to an edge (e.g., bottom) of the i/o interface 300 and partly or mostly hidden. For example, the virtual keyboard 310 may be moved to the bottom of the i/o interface 300 and just a portion of a few keys may be displayed. For example, just the top half of the Q, W, E, R, T, Y, U, I, O and P keys may be displayed. Additionally, the keys may be reduced in size. When the virtual keyboard 310 is needed again, the virtual keyboard 310 may be displayed at a desired position in a desired size. Having some of the keys available in a known accessible location, even though diminished in size, or only partially displayed, saves display space while making retrieving the virtual keyboard 310 simple and intuitive, which in turn prevents compromising the typing experience. The user may indicate that they want to use the virtual keyboard 310 by, for example, making a gesture in the hover-space associated with the i/o interface 300. For example, the user may place a digit(s) in a location where the user habitually types, the user may make a swiping motion from the bottom of the i/o interface 300 towards the middle of the i/o interface 300, the user may simulate a typing movement, or may take another action. The action may be unrelated to the location of the virtual keyboard 310.

FIG. 4 illustrates another embodiment of an i/o interface 400 displaying a virtual keyboard, a text insertion point 420, header information 430, and text 440. In this embodiment, when the virtual keyboard is not needed, the virtual keyboard may be split into two parts (e.g., 410A and 410B) and the parts may be moved to the edges (e.g., sides) of the i/o interface 400. Once again, less than one hundred percent of the pieces may be displayed. In one example, the keyboard may be split vertically and just the f and g keys may be displayed on the left side of the i/o interface and just the j and k keys may be displayed on the right side of the i/o interface. In another embodiment, the keyboard may be split horizontally and just the t and y keys displayed at the top of the i/o interface with just the b and n keys displayed at the bottom of the i/o interface. When the keyboard is needed or desired again, it may be reconfigured in response to a user action. For example, a swipe gesture down from the t or y key or simply in the "down" direction independent of the location of a key may cause the keyboard to once again be fully displayed and positioned in a preferred location. Similarly, a swipe gesture up from the b or n key or simply in the "up" direction independent of the location of a key may cause the keyboard to be readied for input. While four keys and a swipe gesture are described, a greater or lesser number of keys may be displayed and a different gesture may be employed.

Conventionally, a display manufacturer or programmer may have determined the size, shape, position, and performance of a virtual keyboard. In one embodiment, an application programming interface (API) through which an application can communicate with a process that controls the virtual keyboard may be provided. Thus, in one example, keyboard performance may be controlled on a per application basis.

Some portions of the detailed descriptions that follow are presented in terms of algorithms and symbolic representations of operations on data bits within a memory. These algorithmic descriptions and representations are used by those skilled in the art to convey the substance of their work to others. An algorithm is considered to be a sequence of operations that produce a result. The operations may include creating and manipulating physical quantities that may take the form of electronic values. Creating or manipulating a physical quantity in the form of an electronic value produces a concrete, tangible, useful, real-world result.

It has proven convenient at times, principally for reasons of common usage, to refer to these signals as bits, values, elements, symbols, characters, terms, numbers, and other terms. It should be borne in mind, however, that these and similar terms are to be associated with the appropriate physical quantities and are merely convenient labels applied to these quantities. Unless specifically stated otherwise, it is appreciated that throughout the description, terms including processing, computing, and determining, refer to actions and processes of a computer system, logic, processor, or similar electronic device that manipulates and transforms data represented as physical quantities (e.g., electronic values).

Example methods may be better appreciated with reference to flow diagrams. For simplicity, the illustrated methodologies are shown and described as a series of blocks. However, the methodologies may not be limited by the order of the blocks because, in some embodiments, the blocks may occur in different orders than shown and described. Moreover, fewer than all the illustrated blocks may be required to implement an example methodology. Blocks may be combined or separated into multiple components. Furthermore, additional or alternative methodologies can employ additional, not illustrated blocks.

Figure 5:
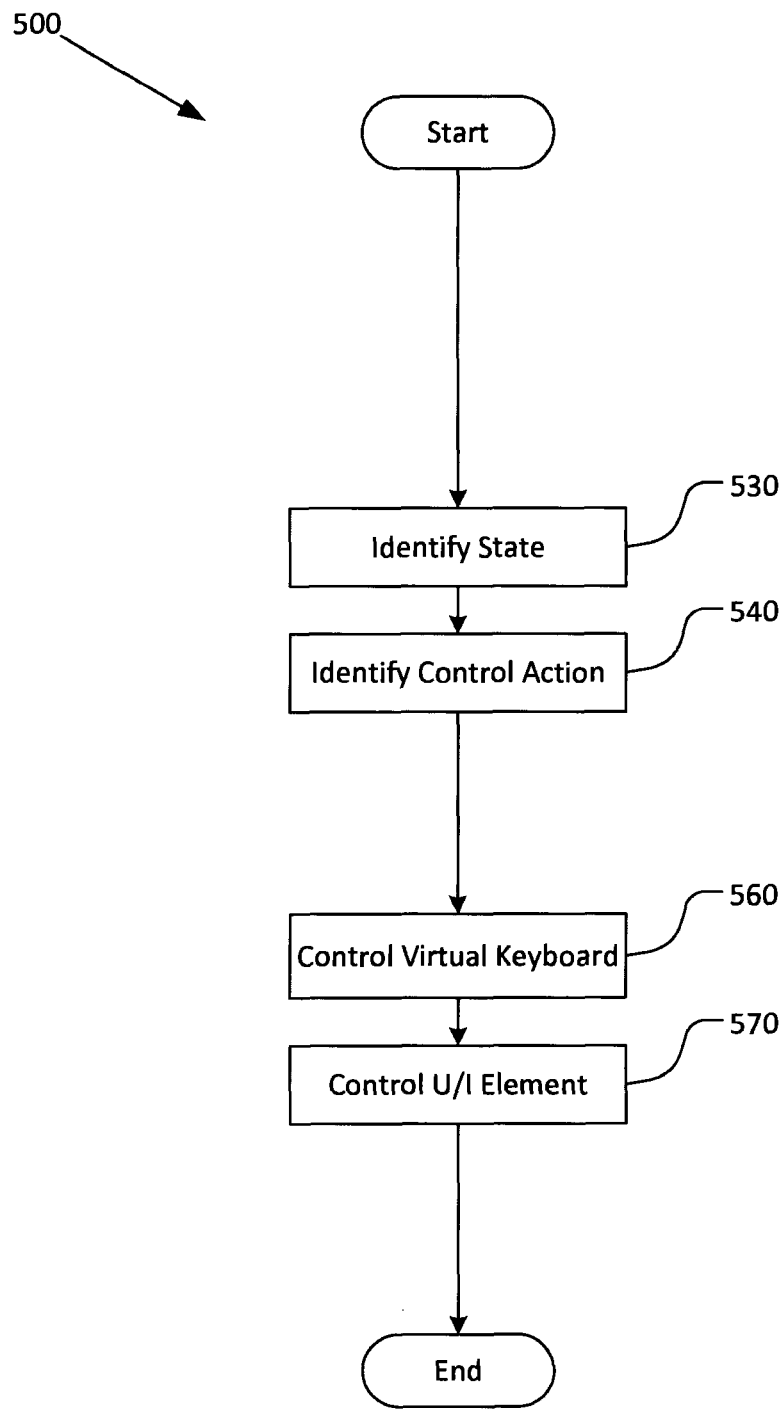
FIG. 5 illustrates an example method associated with a hover controlled user interface element.

FIG. 5 illustrates an example method 500 associated with a hover controlled user interface element. Method 500 controls a user interface on a device having an i/o interface that is hover-space sensitive. Method 500 includes, at 530, identifying a state associated with a user interface element associated with the i/o interface. The state may be, for example, that the user interface element is active to receive user interactions, that the user interface element is not active to receive user interactions, that the user interface element has the focus of an application, that the user interface element has the focus of an operating system, that the user interface element is minimized or maximized, that the user interface element is currently visible or not visible on the i/o interface, or other information. The state may depend, at least in part, on a user action performed using a virtual keyboard that is displayable on the i/o interface. For example, if the virtual keyboard is being used, then the state associated with a text entry tool may control that a text insertion point also be visible on the i/o interface. In another example, if the virtual keyboard is not being used, then the state associated with the text entry tool may control that the text entry point not be visible on the i/o interface and that certain text (e.g., oldest text, newest text) be visible. While state associated with a text insertion tool and a keyboard is described, other state associated with other user interface elements may be maintained and may control an i/o interface display.

Method 500 also includes, at 540, identifying a control action performed by an object in a hover-space associated with the i/o interface. Recall that the hover-space is a three dimensional volume existing in an area accessible to the i/o interface. The three dimensional volume may be positioned conceptually "above" an i/o interface. However, "above" may be a relative term meaning located in a direction from which the i/o interface can be viewed and in between the i/o interface and a viewer of the i/o interface. If the user is standing up and reading on a tablet, then the space "above" the i/o interface may actually be horizontally displaced from the device rather than vertically displaced. If the user is lying on their back, then the hover-space may be below the device. A hover-space may have different sized dimensions in different applications depending, for example, on the type of technology used by a proximity detector that provides the hover-sensitivity.

In one embodiment, identifying the control action includes receiving a signal from a detection system (e.g., proximity detector) provided by the device. The detection system may be an active detection system (e.g., infrared, ultrasonic), a passive detection system (e.g., capacitive), or a combination of systems. The detection system may be incorporated into the device or provided by the device. Unlike conventional systems whose proximity systems may provide position information (e.g., x, y, z co-ordinates) that are mapped to locations on the i/o interface, example systems may identify a gesture independent of the position of the virtual keyboard or i/o interface. For example, a simulated typing gesture may be used to indicate the desire to retrieve the keyboard. The occurrence of the simulated typing gesture, rather than its location, may control whether to retrieve the virtual keyboard.

Identifying the control action may also include other actions. For example, identifying the control action may include determining that a digit has entered the hover-space or has left the hover-space. A digit appearing in the hover-space may indicate that the keyboard is needed while the disappearance of the digit may indicate that the keyboard is no longer needed. Identifying the control action may also include identifying the presence of a digit at a pre-determined location in the hover-space. The pre-determined location may be relative to the i/o interface or may be relative to the position of the virtual keyboard. Identifying the control action may also include identifying a gesture (e.g., simulated typing, swipe) that is characterized in relation to where it is performed relative to the position of the virtual keyboard. In one embodiment, the control action may actually be inaction. For example, identifying the control action may include identifying that a digit has moved less than a threshold amount in the hover-space over a threshold period of time. For example, if a finger in the hover-space has moved less than 2 mm in the past three seconds, then this may be an indication that the user has stopped typing and the keyboard is no longer required.

Method 500 also includes, at 560, selectively controlling the availability of the virtual keyboard on the i/o interface as a function of the control action. Controlling the availability may include making the virtual keyboard visible, removing the virtual keyboard, changing the appearance of the virtual keyboard, changing whether the virtual keyboard is able to interact with objects in the hover-space, or other actions. In one embodiment, controlling the availability of the virtual keyboard at 560 includes making one hundred percent of the virtual keyboard visible on the i/o interface and making virtual keys associated with the virtual keyboard active for receiving a virtual keystroke. In another embodiment, controlling the availability of the virtual keyboard at 560 may include making less than one hundred percent of the virtual keyboard visible on the i/o interface and making virtual keys associated with the virtual keyboard inactive for receiving a virtual keystroke. In another embodiment, controlling the availability of the virtual keyboard at 560 may include splitting the virtual keyboard into at least two pieces and then rearranging the at least two pieces. In one example, re-arranging the two pieces may include positioning a first piece at a first position (e.g., left side) on the i/o interface and positioning a second piece at a second, different position (e.g., right side) on the i/o interface. Additionally, less than one hundred percent of a piece may be visible on the i/o interface.

In another embodiment, controlling the availability of the virtual keyboard at 560 may include positioning a portion of the virtual keyboard within a threshold distance of an edge of the input/output interface. For example, the portion may be placed within 1 mm of the edge, within 5 mm of the edge, within 10 mm of the edge, within 1 pixel of the edge, within 10 pixels of the edge, within one percent of the width of the viewable area of the i/o interface from the edge, within ten percent of the width of the viewable area of the i/o interface from the edge, or at other locations. In yet another embodiment, controlling the availability of the virtual keyboard comprises changing the opacity of the virtual keyboard. For example, the keyboard may be made more or less opaque depending on whether it is being used. If the keyboard is being used, then it may be completely or mostly opaque so that it appears to be on top of other information on the i/o interface. But if the keyboard is not being used, then it may be completely or mostly transparent so that it appears to be behind other information on the i/o interface. While splitting a keyboard, changing the opacity of a keyboard, and repositioning a keyboard are displayed, other techniques for minimizing the amount of space used by a virtual keyboard when the virtual keyboard is not in use may be employed.

Method 500 also includes, at 570, selectively configuring the user interface element as a function of the state and the control action. For example, the presence and location of a text insertion point may be controlled based on whether the virtual keyboard is being displayed or used. Configuring the user interface element at 570 may include selectively displaying the user interface element on the i/o interface at a location that makes an insertion point associated with the user interface element visible during virtual typing performed using the virtual keyboard. The location may depend, at least in part, on the state.

While FIG. 5 and method 500 have described a virtual keyboard, more generally a user interface element may be reconfigured based on a characterization of a control action performed in the hover-space. For example, if a user is going to interact with a device, appropriate user interface elements may be presented when the user hovers in the hover-space and the user interface elements may be removed when the user stops hovering in the hover-space. This may be employed in applications including, for example, a virtual video cassette recorder (VCR) where VCR controls are presented or removed based on hovering over a playing movie.

Figure 6:
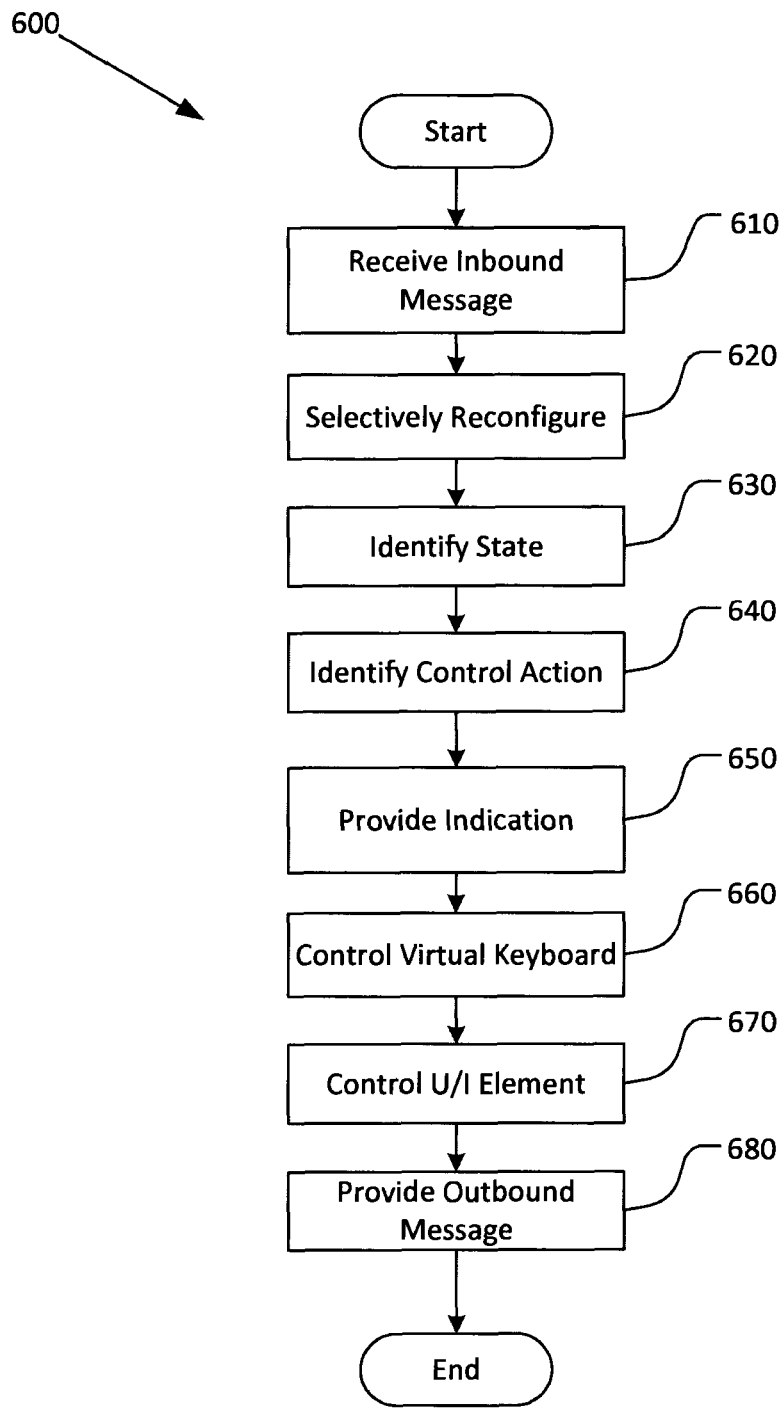
FIG. 6 illustrates an example method associated with a hover controlled user interface element.

FIG. 6 illustrates an example method 600 that is similar to method 500 (FIG. 5). For example, method 600 includes identifying state at 630, identifying a control action at 640, controlling a virtual keyboard at 660, and controlling a user interface element at 670. However, method 600 also includes additional actions at 610, 620, 650, and 680. Conventionally, the appearance of user interface elements may have been configurable through on-screen configuration. However, the presenting and removal of user interface elements was not configurable. Additionally, configuration may have occurred through user interaction with the element not through programmatic control. Example apparatus and methods provide a more configurable and extensible approach to reconfiguring user interface elements. For example, even the form and result of the control action may be user configurable.

To support this configurability, method 600 may include, at 610, receiving an inbound message. The inbound message may be received through, for example, an application programming interface (API) provided by a process running on the device. In different embodiments the inbound message may also be received using other message passing approaches including, for example, sockets, remote procedure calls, interrupts, or shared memory. The inbound message may include configuration information.

Therefore, method 600 may include, at 620, selectively reconfiguring how the availability of the virtual keyboard will be controlled. The reconfiguring may be a function of information in the inbound message and may control, for example, changing the activation, display, or deactivation actions associated with different control actions.

When a messaging interface like the API is available, then method 600 may also include, at 680, selectively providing an outbound message to the process through the API. The outbound message may concern, for example, an action performed using the virtual keyboard or an action performed using the user interface element. The outbound message may facilitate performing some processing off the device that provides the i/o interface.

Method 600 may also include, at 650, providing an indication that the virtual keyboard is about to be re-configured. Consider that a user's attention may be distracted while using a handheld device (e.g., phone, tablet). Rather than automatically changing the state of the virtual keyboard, method 600 may provide an indication that something is about to happen to provide the user with an opportunity to not have the action occur. The indication may be, for example, a graphical indication (e.g., flashing screen), an audible indication (e.g., warning buzzer), a haptic indication (e.g., vibration) or combination of actions. The indication may alert the user to an impending action (e.g., keyboard being removed) and allow the user to take an action (e.g., accelerate device) to avert the impending action.

While FIGS. 5 and 6 illustrate various actions occurring in serial, it is to be appreciated that various actions illustrated in FIGS. 5 and 6 could occur substantially in parallel. By way of illustration, a first process could identify and maintain state, a second process could characterize control actions that occur in the hover-space, and a third process could control i/o interface display space by selectively activating, displaying, de-activating, or removing user interface elements as a function of the state and control action. While three processes are described, it is to be appreciated that a greater or lesser number of processes could be employed and that lightweight processes, regular processes, threads, and other approaches could be employed.

In one example, a method may be implemented as computer executable instructions. Thus, in one example, a computer-readable storage medium may store computer executable instructions that if executed by a machine (e.g., computer) cause the machine to perform methods described or claimed herein including methods 500 or 600. While executable instructions associated with the listed methods are described as being stored on a computer-readable storage medium, it is to be appreciated that executable instructions associated with other example methods described or claimed herein may also be stored on a computer-readable storage medium. In different embodiments, the example methods described herein may be triggered in different ways. In one embodiment, a method may be triggered manually by a user. In another example, a method may be triggered automatically.

Figure 7:
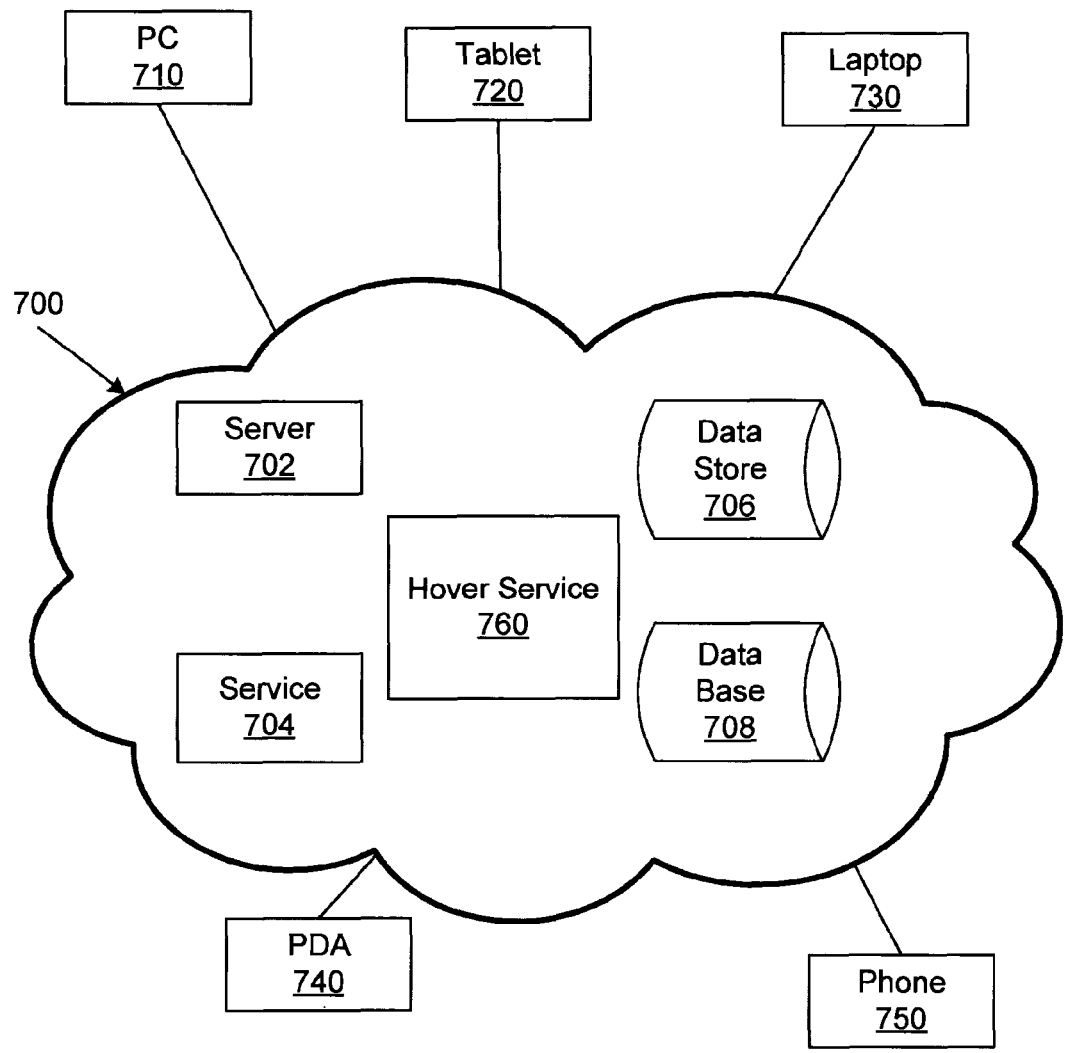
FIG. 7 illustrates an example cloud operating environment in which methods or apparatus may facilitate hover control of user interface elements.

FIG. 7 illustrates an example cloud operating environment 700. A cloud operating environment 700 supports delivering computing, processing, storage, data management, applications, and other functionality as an abstract service rather than as a standalone product. Services may be provided by virtual servers that may be implemented as one or more processes on one or more computing devices. In some embodiments, processes may migrate between servers without disrupting the cloud service. In the cloud, shared resources (e.g., computing, storage) may be provided to computers including servers, clients, and mobile devices over a network. Different networks (e.g., Ethernet, Wi-Fi, 802.x, cellular) may be used to access cloud services. Users interacting with the cloud may not need to know the particulars (e.g., location, name, server, database) of a device that is actually providing the service (e.g., computing, storage). Users may access cloud services via, for example, a web browser, a thin client, a mobile application, or in other ways.

FIG. 7 illustrates an example hover service 760 residing in the cloud. The hover service 760 may rely on a server 702 or service 704 to perform processing and may rely on a data store 706 or database 708 to store data. While a single server 702, a single service 704, a single data store 706, and a single database 708 are illustrated, multiple instances of servers, services, data stores, and databases may reside in the cloud and may, therefore, be used by the computer game service 760.

FIG. 7 illustrates various devices accessing the hover service 760 in the cloud. The devices include a computer 710, a tablet 720, a laptop computer 730, a personal digital assistant 740, and a mobile device (e.g., cellular phone, satellite phone) 750.

It is possible that different users at different locations using different devices may access the hover service 760 through different networks or interfaces. In one example, the hover service 760 may be accessed by a mobile device 750. In another example, portions of hover service 760 may reside on a mobile device 750. Hover service 760 may perform actions including, for example, configuring how control actions will be interpreted on a hover-sensitive device, providing appearance, location, or control information for a user interface element, or other action. In one embodiment, hover service 760 may perform portions of methods described herein (e.g., method 500, method 600).

Figure 8:
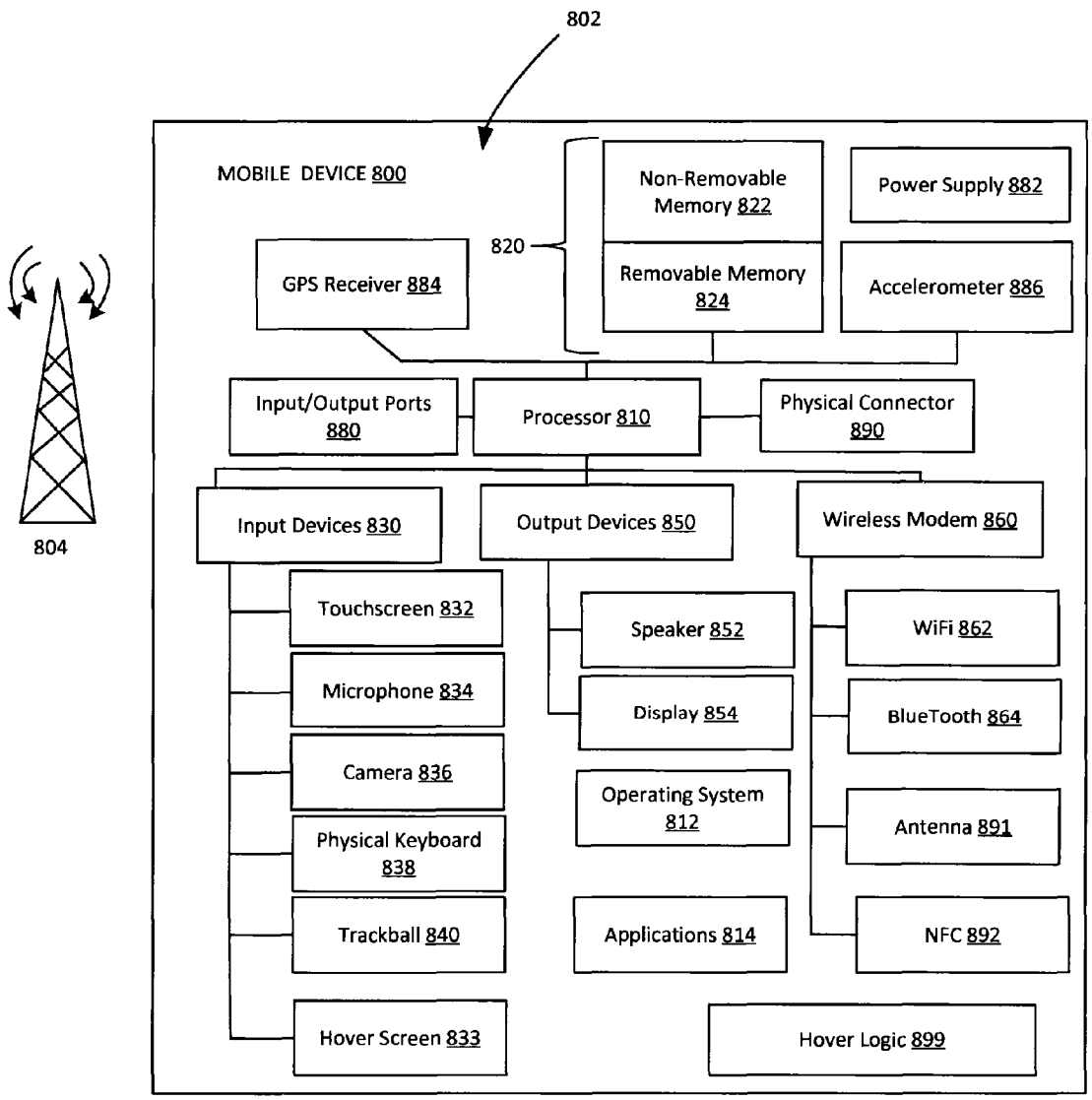
FIG. 8 is a system diagram depicting an exemplary mobile communication device configured to support hover control of user interface elements.

FIG. 8 is a system diagram depicting an exemplary mobile device 800 that includes a variety of optional hardware and software components, shown generally at 802. Components 802 in the mobile device 800 can communicate with other components, although not all connections are shown for ease of illustration. The mobile device 800 may be a variety of computing devices (e.g., cell phone, smartphone, handheld computer, Personal Digital Assistant (PDA), etc.) and may allow wireless two-way communications with one or more mobile communications networks 804, such as a cellular or satellite networks.

Mobile device 800 can include a controller or processor 810 (e.g., signal processor, microprocessor, application specific integrated circuit (ASIC), or other control and processing logic circuitry) for performing tasks including signal coding, data processing, input/output processing, power control, or other functions. An operating system 812 can control the allocation and usage of the components 802 and support application programs 814. The application programs 814 can include mobile computing applications (e.g., email applications, calendars, contact managers, web browsers, messaging applications), or other computing applications.

Mobile device 800 can include memory 820. Memory 820 can include non-removable memory 822 or removable memory 824. The non-removable memory 822 can include random access memory (RAM), read only memory (ROM), flash memory, a hard disk, or other memory storage technologies. The removable memory 824 can include flash memory or a Subscriber Identity Module (SIM) card, which is known in GSM communication systems, or other memory storage technologies, such as "smart cards." The memory 820 can be used for storing data or code for running the operating system 812 and the applications 814. Example data can include user interface element state, web pages, text, images, sound files, video data, or other data sets to be sent to or received from one or more network servers or other devices via one or more wired or wireless networks. The memory 820 can store a subscriber identifier, such as an International Mobile Subscriber Identity (IMSI), and an equipment identifier, such as an International Mobile Equipment Identifier (IMEI). The identifiers can be transmitted to a network server to identify users or equipment.

The mobile device 800 can support one or more input devices 830 including, but not limited to, a touchscreen 832, a hover screen 833, a microphone 834, a camera 836, a physical keyboard 838, or trackball 840. While a touch screen 832 and a physical keyboard 838 are described, in one embodiment a screen may be hover-sensitive and may display a virtual keyboard. The mobile device 800 may also support output devices 850 including, but not limited to, a speaker 852 and a display 854. Other possible input devices (not shown) include accelerometers (e.g., one dimensional, two dimensional, three dimensional). Other possible output devices (not shown) can include piezoelectric or other haptic output devices. Some devices can serve more than one input/output function. For example, touchscreen 832 and display 854 can be combined in a single input/output device. The input devices 830 can include a Natural User Interface (NUI). An NUI is an interface technology that enables a user to interact with a device in a "natural" manner, free from artificial constraints imposed by input devices such as mice, keyboards, remote controls, and others. Examples of NUI methods include those relying on speech recognition, touch and stylus recognition, gesture recognition (both on screen and adjacent to the screen), air gestures, head and eye tracking, voice and speech, vision, touch, gestures, and machine intelligence. Other examples of a NUI include motion gesture detection using accelerometers/gyroscopes, facial recognition, three dimensional (3D) displays, head, eye, and gaze tracking, immersive augmented reality and virtual reality systems, all of which provide a more natural interface, as well as technologies for sensing brain activity using electric field sensing electrodes (electro-encephalogram (EEG) and related methods). Thus, in one specific example, the operating system 812 or applications 814 can comprise speech-recognition software as part of a voice user interface that allows a user to operate the device 800 via voice commands. Further, the device 800 can include input devices and software that allow for user interaction via a user's spatial gestures, such as detecting and interpreting gestures to provide input to an application.

A wireless modem 860 can be coupled to an antenna 891. In some examples, radio frequency (RF) filters are used and the processor 810 need not select an antenna configuration for a selected frequency band. The wireless modem 860 can support two-way communications between the processor 810 and external devices. The modem 860 is shown generically and can include a cellular modem for communicating with the mobile communication network 804 and/or other radio-based modems (e.g., Bluetooth 864 or Wi-Fi 862). The wireless modem 860 may be configured for communication with one or more cellular networks, such as a Global system for mobile communications (GSM) network for data and voice communications within a single cellular network, between cellular networks, or between the mobile device and a public switched telephone network (PSTN). Mobile device 800 may also communicate locally using, for example, near field communication (NFC) element 892.

The mobile device 800 may include at least one input/output port 880, a power supply 882, a satellite navigation system receiver 884, such as a Global Positioning System (GPS) receiver, an accelerometer 886, or a physical connector 890, which can be a Universal Serial Bus (USB) port, IEEE 1394 (FireWire) port, RS-232 port, or other port. The illustrated components 802 are not required or all-inclusive, as other components can be deleted or added.

Mobile device 800 may include a hover logic 899 that is configured to provide a functionality for the mobile device 800. For example, hover logic 899 may provide a client for interacting with a service (e.g., service 760, FIG. 7). Portions of the example methods described herein may be performed by hover logic 899. Similarly, hover logic 899 may implement portions of apparatus described herein.

Figure 9:
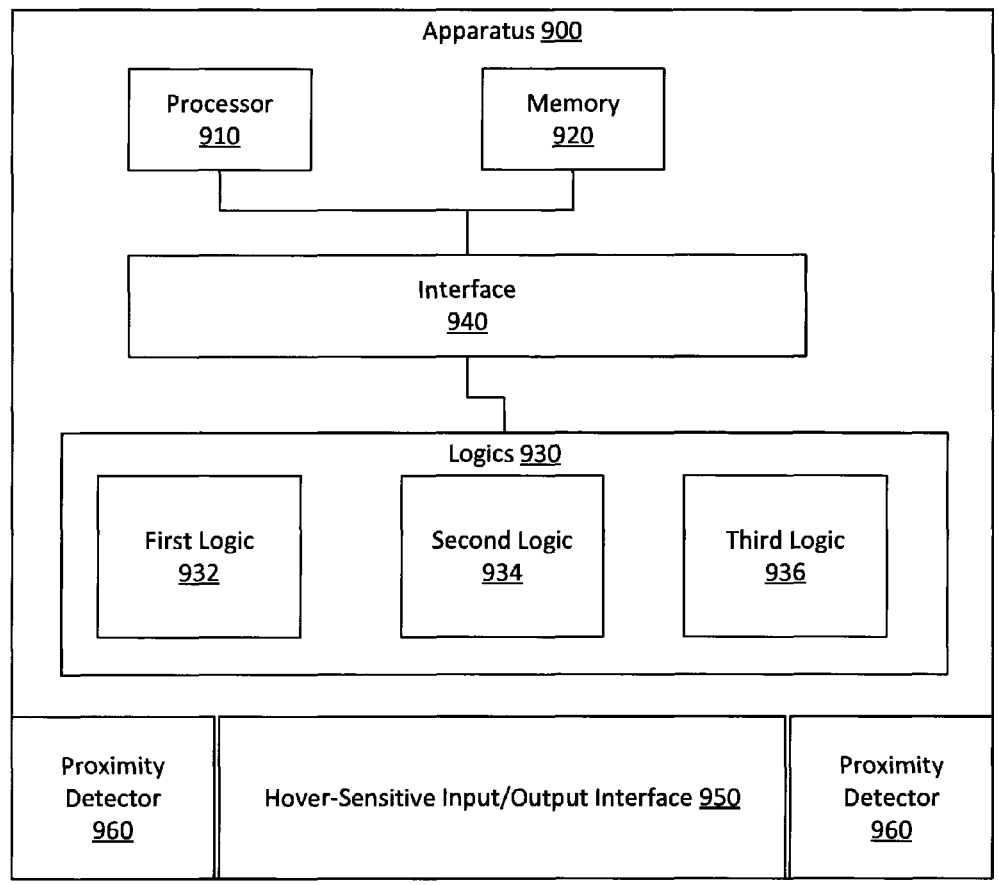
FIG. 9 illustrates an example apparatus that performs hover control of a user interface element.
Figure 9:
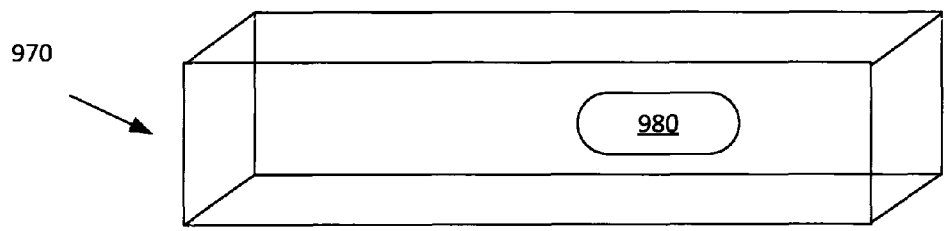

FIG. 9 illustrates an apparatus 900 that performs hover-based control of a user interface element. In one example, the apparatus 900 includes an interface 940 configured to connect a processor 910, a memory 920, a set of logics 930, a proximity detector 960, and a hover sensitive i/o interface 950. Elements of the apparatus 900 may be configured to communicate with each other, but not all connections have been shown for clarity of illustration.

The proximity detector 960 may detect an object 980 in a hover-space 970 associated with the apparatus 900. The hover-space 970 may be, for example, a three dimensional volume disposed in proximity to the i/o interface 950 and in an area accessible to the proximity detector 960. A user may place a digit in the hover-space 970, may make a gesture in the hover-space 970, may remove a digit from the hover-space 970, or take other actions.

Apparatus 900 may include a first logic 932 that is configured to produce characterization data concerning the object. In one embodiment, the characterization data is independent of where the object 980 is located in the hover-space 970. For example, the characterization data may describe the size and movement of the object 980 without reporting on its location. In one embodiment, the characterization data may describe whether the object 980 is present, a direction of travel of the object 980, a velocity of travel of the object 980, an orientation of the object 980, a size of the object 980, or a gesture performed by the object 980. The characterization data may depend on signals provided by the proximity detector 960 to the first logic 932.

Apparatus 900 may include a second logic 934 that is configured to selectively control the activation, display, and deactivation of a first user interface element displayed by the apparatus 900 on the i/o interface 950. The activation, display, and deactivation may be controlled as a function of the characterization data. In one embodiment, selectively controlling the activation, display, and deactivation of the first user interface element includes allocating display space on the i/o interface 950 to the first user interface element when the first user interface element is needed for an operation on the apparatus 900. Selectively controlling the activation, display, and deactivation of the first user interface element may also include selectively reclaiming space that was allocated to the first user interface element on the i/o interface 950 when the first user interface element is not needed for an operation on the apparatus 900. The space may be reclaimed in different ways. For example, the first user interface element may be moved to the edge of the i/o interface 950, may be split and moved to different edges of the i/o interface 950, may be reduced to a few keys that are then made more transparent to appear behind an application, or in other ways.

In one embodiment, the second logic 934 is configured to control the activation, display, and deactivation of a second user interface element displayed by the apparatus 900 on the i/o interface 950 as a function of both a state associated with the first user interface element and an action associated with the object 980 and the first user interface element. The second user interface element may display a result of an interaction between the object 980 and the first user interface element. By way of illustration, the first user interface element may be a virtual keyboard that receives virtual keystrokes and the second user interface element may be a text box that inserts text at a text insertion point. In one embodiment, the second logic 934 is configured to control the activation, display, or deactivation of the first user interface element within a threshold amount of time of receiving access to the characterization data. For example, the second logic 934 may be configured to control the activation, display, or deactivation of the first user interface element within a second of receiving access to the characterization data, within a tenth of a second of receiving access to the characterization data, within a hundredth of a second of receiving access to the characterization data, within a millisecond of receiving access to the characterization data, or within other periods of time. In one embodiment, the amount of time may be user configurable.

In one embodiment, controlling the activation, display, and deactivation of the first user interface element includes displaying one hundred percent of the first user interface element on the i/o interface 950 and activating the first user interface element to interact with the object 980. Controlling the activation, display, and deactivation of the first user interface element may also include displaying less than one hundred percent of the first interface element on the i/o interface 950 and deactivating the first user interface element from interacting with the object 980. Controlling the activation, display, and deactivation of the first user interface element may also include dividing the first user interface element into at least two pieces, positioning one of the pieces at a first position on the i/o interface 950, and positioning another of the pieces at a second, different position on the i/o interface 950. Controlling the activation, display, and deactivation of the first user interface element may also include positioning a portion of the first user interface element within a threshold distance of an edge of the i/o interface 950, or changing the transparency of the first user interface element.

Apparatus 900 may include a third logic 936 that reconfigures the first logic 932 or the second logic 934 based on a message received from a user or an application through a messaging interface. The message may describe, for example, how the user would like a virtual keyboard to be diminished when it is not needed.

Apparatus 900 may include a memory 920. Memory 920 can include non-removable memory or removable memory. Non-removable memory may include random access memory (RAM), read only memory (ROM), flash memory, a hard disk, or other memory storage technologies. Removable memory may include flash memory, or other memory storage technologies, such as "smart cards." Memory 920 may be configured to store user interface state information, control action characterization data, or other data.

Apparatus 900 may include a processor 910. Processor 910 may be, for example, a signal processor, a microprocessor, an application specific integrated circuit (ASIC), or other control and processing logic circuitry for performing tasks including signal coding, data processing, input/output processing, power control, or other functions. Processor 910 may be configured to control user interface element presentation and functionality. For example, processor 910 may be controlled to selectively allow a user interface element (e.g., keyboard) to consume more space on i/o interface 950 when the user interface element is needed and to selectively diminish the amount of space the user interface element consumes on the i/o interface 950 when the user interface element is not needed.

In one embodiment, the apparatus 900 may be a general purpose computer that has been transformed into a special purpose computer through the inclusion of the set of logics 930. The set of logics 930 may be configured to perform input and output. Apparatus 900 may interact with other apparatus, processes, and services through, for example, a computer network.

The following includes definitions of selected terms employed herein. The definitions include various examples or forms of components that fall within the scope of a term and that may be used for implementation. The examples are not intended to be limiting. Both singular and plural forms of terms may be within the definitions.

Opacity, as used herein, refers to how much a first image on a display will obscure a second image on the display, where the second image is perceived as being behind the first image. Zero percent opacity means the first image will obscure zero percent of the second image. One hundred percent opacity means the first image will obscure one hundred percent of the second image. Opacity may be defined using, for example, an alpha channel. The alpha channel is used in alpha compositing, which is the process of combining an image with a background to create the appearance of partial or full transparency.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage medium", as used herein, refers to a medium that stores instructions or data. "Computer-readable storage medium" does not refer to propagated signals. A computer-readable storage medium may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage medium may include, but are not limited to, a floppy disk, a flexible disk, a hard disk, a magnetic tape, other magnetic medium, an application specific integrated circuit (ASIC), a compact disk (CD), a random access memory (RAM), a read only memory (ROM), a memory chip or card, a memory stick, and other media from which a computer, a processor or other electronic device can read.

"Data store", as used herein, refers to a physical or logical entity that can store data. A data store may be, for example, a database, a table, a file, a list, a queue, a heap, a memory, a register, and other physical repository. In different examples, a data store may reside in one logical or physical entity or may be distributed between two or more logical or physical entities.

"Logic", as used herein, includes but is not limited to hardware, firmware, software in execution on a machine, or combinations of each to perform a function(s) or an action(s), or to cause a function or action from another logic, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the Applicant intends to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for controlling a user interface on a device having a hover-sensitive input/output interface, the method comprising:
    identifying a state associated with a user interface element associated with the input/output interface, where the state depends, at least in part, on a user action performed using a virtual keyboard that is displayable on the input/output interface;
    identifying a control action performed by an object in a hover-space associated with the input/output interface, where the hover-space comprises a three dimensional volume existing in an area accessible to the input/output interface;
    selectively controlling the availability of the virtual keyboard on the input/output interface as a function of the control action; and
    selectively configuring the user interface element as a function of the state and the control action.

2. The method of claim 1, comprising selectively displaying the user interface element on the input/output interface at a location that makes an insertion point associated with the user interface element visible during virtual typing performed using the virtual keyboard, where the location depends, at least in part, on the state.

3. The method of claim 1, where identifying the control action comprises identifying a gesture independent of the position of the virtual keyboard.

4. The method of claim 1, where identifying the control action comprises:
    identifying the entry of a digit into the hover-space,
    identifying the presence of a digit at a pre-determined location in the hover-space,
    identifying the presence of a digit at a location in the hover-space related to the position of the virtual keyboard,
    identifying a gesture that is related to the position of the virtual keyboard,
    identifying the removal of a digit from the hover-space, or
    identifying that a digit has moved less than a threshold amount in the hover-space over a threshold period of time.

5. The method of claim 1, where the control action is user configurable.

6. The method of claim 1, where identifying the control action comprises:
    receiving a signal from an active detection system provided by the device, or
    receiving a signal from a passive detection system provided by the device.

7. The method of claim 1, where controlling the availability of the virtual keyboard comprises:
    making one hundred percent of the virtual keyboard visible on the input/output interface, and
    making virtual keys associated with the virtual keyboard active for receiving a virtual keystroke.

8. The method of claim 7, where controlling the availability of the virtual keyboard comprises:
    making less than one hundred percent of the virtual keyboard visible on the input/output interface, and
    making virtual keys associated with the virtual keyboard inactive for receiving a virtual keystroke.

9. The method of claim 8, comprising:
    splitting the virtual keyboard into at least two pieces;
    positioning a first piece of the at least two pieces at a first position on the input/output interface, and
    positioning a second piece of the at least two pieces at a second, different position on the input/output interface,
    where less than one hundred percent of the first piece is visible on the input/output interface and where less than one hundred percent of the second piece is visible on the input/output interface.

10. The method of claim 8, comprising:
    positioning a portion of the virtual keyboard within a threshold distance of an edge of the input/output interface.

11. The method of claim 7, where controlling the availability of the virtual keyboard comprises changing the opacity of the virtual keyboard.

12. The method of claim 1, comprising:
    providing an indication that the virtual keyboard is about to be re-configured, the indication being a graphical indication, an audible indication, or a haptic indication.

13. The method of claim 1, comprising:
    receiving an inbound message through an application programming interface (API) provided by a process running on the device, and
    selectively reconfiguring how the availability of the virtual keyboard will be controlled as a function of the control action based on the inbound message.

14. The method of claim 13, comprising:
    selectively providing an outbound message to the process through the API, where the outbound message concerns an action performed using the virtual keyboard or an action performed using the user interface element.

15. A computer-readable storage medium storing computer-executable instructions that when executed by a computer cause the computer to perform a method, the method comprising:
    identifying a state associated with a user interface element associated with an input/output interface, where the state depends, at least in part, on a user action performed using a virtual keyboard that is displayable on the input/output interface;

identifying a user configurable control action performed by an object in a hover-space associated with the input/output interface, where the hover-space comprises a three dimensional volume existing in an area accessible to the input/output interface, where identifying the control action comprises:

receiving a signal from an active detection system provided by the device or from a passive detection system provided by the device, where the signal identifies a gesture independent of the position of the virtual keyboard, identifies the entry of a digit into the hover-space, identifies the presence of a digit at a pre-determined location in the hover-space, identifies the presence of a digit at a location in the hover-space related to the position of the virtual keyboard, identifies a gesture that is related to the position of the virtual keyboard, identifies the removal of a digit from the hover-space, or identifies that a digit has moved less than a threshold amount in the hover-space over a threshold period of time;

selectively controlling the availability of the virtual keyboard on the input/output interface as a function of the control action, where controlling the availability of the virtual keyboard happens within a threshold amount of time, and where controlling the availability of the virtual keyboard comprises:

making one hundred percent of the virtual keyboard visible on the input/output interface and making virtual keys associated with the virtual keyboard active for receiving a virtual keystroke;

making less than one hundred percent of the virtual keyboard visible on the input/output interface, and making virtual keys associated with the virtual keyboard inactive for receiving a virtual keystroke;

splitting the virtual keyboard into at least two pieces, positioning a first piece of the at least two pieces at a first position on the input/output interface, and positioning a second piece of the at least two pieces at a second, different position on the input/output interface, where less than one hundred percent of the first piece is visible on the input/output interface and where less than one hundred percent of the second piece is visible on the input/output interface;

positioning a portion of the virtual keyboard within a threshold distance of an edge of the input/output interface, or changing the opacity of the virtual keyboard;

selectively configuring the user interface element as a function of the state and the control action;

selectively displaying the user interface element on the input/output interface at a location that makes an insertion point associated with the user interface element visible during virtual typing performed in the hover-space using the virtual keyboard, where the location depends, at least in part, on the state;

providing an indication that the virtual keyboard is about to be re-configured, the indication being a graphical indication, an audible indication, or a haptic indication;

receiving an inbound message through an application programming interface (API) provided by a process running on the device;

selectively reconfiguring how the availability of the virtual keyboard will be controlled as a function of the control action based on the inbound message, and selectively providing an outbound message to the process through the API, where the outbound message concerns an action performed using the virtual keyboard or an action performed using the user interface element.

16. An apparatus, comprising:
a hover-sensitive input/output interface;
a proximity detector configured to detect an object in a hover-space comprising a three dimensional volume disposed in proximity to the input/output interface;
at least one processor creating a first signal configured to produce characterization data concerning the object, where the characterization data is independent of where the object is located in the hover-space; and
creating a second signal configured to selectively control the activation, display, and deactivation of a first user interface element displayed by the apparatus on the input/output interface as a function of the characterization data, where selectively controlling the activation, display, and deactivation of the first user interface element includes allocating display space on the input/output interface to the first user interface element when the first user interface element is needed for an operation on the apparatus and selectively reclaiming space on the input/output interface allocated to the first user interface element when the first user interface element is not needed for an operation on the apparatus.

17. The apparatus of claim 16, where the characterization data describes a presence of the object, a direction of travel of the object, a velocity of travel of the object, an orientation of the object, a size of the object, or a gesture performed by the object.

18. The apparatus of claim 16, where controlling the activation, display, and deactivation of the first user interface element comprises:

displaying one hundred percent of the first user interface element on the input/output interface and activating the first user interface element to interact with the object;

displaying less than one hundred percent of the first interface element on the input/output interface and deactivating the first user interface element from interacting with the object;

dividing the first user interface element into at least two pieces, positioning a first piece of the at least two pieces at a first position on the input/output interface, and positioning a second piece of the at least two pieces at a second, different position on the input/output interface;

positioning a portion of the first user interface element within a threshold distance of an edge of the input/output interface, or changing the transparency of the first user interface element.

19. The apparatus of claim 16, where the second signal is configured to control the activation, display, and deactivation of a second user interface element displayed by the apparatus on the input/output interface as a function of a state associated with the first user interface element and an action associated with the object and the first user interface element, where the second user interface element displays a result of an interaction between the object and the first user interface element, and where the second signal is configured to control the activation, display, and deactivation of the first user interface element within a threshold amount of time of receiving access to the characterization data.

20. The apparatus of claim 19, comprising a third logic configured to reconfigure the first signal or the second signal based on a message received from a user or an application through a messaging interface.

* * * * *